(12) United States Patent
Oishi

(10) Patent No.: US 10,320,072 B2
(45) Date of Patent: Jun. 11, 2019

(54) MOVABLE ANTENNA AND INSPECTION APPARATUS

(71) Applicant: TOSHIBA TEC KABUSHIKI KAISHA, Tokyo (JP)

(72) Inventor: Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/979,833

(22) Filed: May 15, 2018

(65) Prior Publication Data

US 2018/0269572 A1 Sep. 20, 2018

Related U.S. Application Data

(63) Continuation of application No. 15/634,568, filed on Jun. 27, 2017.

(30) Foreign Application Priority Data

Jul. 26, 2016 (JP) .................. 2016-146289

(51) Int. Cl.
*G06F 17/00* (2019.01)
*G06K 7/08* (2006.01)
(Continued)

(52) U.S. Cl.
CPC ........... *H01Q 3/04* (2013.01); *G06K 7/10356* (2013.01); *G06K 7/10376* (2013.01); *H01Q 1/2216* (2013.01); *H01Q 9/0428* (2013.01); *H01Q 9/0457* (2013.01); *H01Q 13/206* (2013.01); *H01Q 21/22* (2013.01)

(58) Field of Classification Search
USPC .................. 235/383, 385, 451, 492
See application file for complete search history.

(56) References Cited

U.S. PATENT DOCUMENTS 6,218,942 B1 4/2001 Vega et al.
6,703,935 B1 * 3/2004 Chung .................... H04L 63/12
340/572.7

(Continued)

FOREIGN PATENT DOCUMENTS

| JP | 2005-247566 A | 9/2005 |
|----|---------------|--------|
| JP | 2009-289297 A | 12/2009 |
| JP | 2011-180912 A | 9/2011 |

OTHER PUBLICATIONS

Extended European Search Report dated Nov. 29, 2017, filed in counterpart European Patent Application No. 17183065.6 (8 pages).

*Primary Examiner* — Tuyen K Vo
(74) *Attorney, Agent, or Firm* — Kim & Stewart LLP

(57) ABSTRACT

According to one embodiment, a movable antenna includes a holder, an antenna radiating element attached to the holder, a first feed element that is attached to the holder and electromagnetically coupled to the antenna radiating element, a base plate in a facing arrangement with the holder, a second feed element on the base plate and configured to face and overlap at least a portion of the first feed element, and a mechanism that moves the holder in a longitudinal direction of the second feed element while maintaining an interval between the first and second feed element permitting energy to be transferred between the first and second feed elements.

16 Claims, 6 Drawing Sheets

(51) Int. Cl.
  *G06K 19/06*   (2006.01)
  *H01Q 3/04*    (2006.01)
  *G06K 7/10*    (2006.01)
  *H01Q 1/22*    (2006.01)
  *H01Q 9/04*    (2006.01)
  *H01Q 21/22*   (2006.01)
  *H01Q 13/20*   (2006.01)

(56) References Cited

U.S. PATENT DOCUMENTS

| | | |
|---|---|---|
| 8,348,163 B2 | 1/2013 | Oishi |
| 8,611,972 B2 | 12/2013 | Sumi et al. |
| 8,851,386 B2 | 10/2014 | Phillips |
| 2005/0159906 A1 | 7/2005 | Tada |
| 2005/0236489 A1 | 10/2005 | Droz |
| 2007/0004363 A1 | 1/2007 | Kusaka et al. |
| 2007/0178911 A1* | 8/2007 | Baumeister ............. G01S 1/022 455/456.1 |
| 2008/0238686 A1 | 10/2008 | Tuttle |
| 2009/0066511 A1 | 3/2009 | Okazaki |
| 2009/0085696 A1 | 4/2009 | Abdul-Gaffoor et al. |
| 2009/0091454 A1 | 4/2009 | Tuttle |
| 2010/0227657 A1 | 9/2010 | Mashima et al. |
| 2011/0304433 A1 | 12/2011 | Molewyk et al. |
| 2012/0280044 A1 | 11/2012 | Mullis et al. |
| 2015/0188214 A1 | 7/2015 | Chang et al. |
| 2015/0302708 A1 | 10/2015 | Hattori |
| 2016/0327634 A1* | 11/2016 | Katz .................... G01S 7/4008 |
| 2016/0349382 A1 | 12/2016 | Hosono et al. |
| 2016/0359238 A1 | 12/2016 | Okunaga et al. |
| 2017/0091494 A1 | 3/2017 | Dabrowski |
| 2017/0286903 A1 | 10/2017 | Elizondo |

* cited by examiner

MOVABLE ANTENNA AND INSPECTION APPARATUS

CROSS-REFERENCE TO RELATED APPLICATIONS

This application is a continuation of U.S. patent application Ser. No. 15/634,568, filed on Jun. 27, 2017, which is based upon and claims the benefit of priority from Japanese Patent Application No. 2016-146289, filed on Jul. 26, 2016, the entire contents of each of which are incorporated herein by reference.

FIELD

Embodiments described herein relate generally to a movable antenna used in a radio frequency identification (RFID) reader-writer and an inspection apparatus.

BACKGROUND

In the related art, there is an inspection apparatus that scans articles one by one with a scanner so as to read a code symbol attached to each article. The inspection apparatus performs an inspection based on article information associated with the code symbol. However, in this inspection apparatus of the related art, since an operator is required to scan the articles one by one with the scanner, the operator has to find a code symbol for each article being scanned and also match the code symbol with an intended reading direction of the scanner each time. Such a process can be a heavy burden for an inexperienced operator. Likewise, as the number of articles to be inspected increases, the burden on the operator also undesirably increases further.

There is an inspection apparatus that reads information from an RFID tag attached to each article being inspected and performs the inspection based on the article information associated with the RFID tag. For example, an apparatus that reads tag information from several items included with a case placed on the upper surface of a counter in which a flat antenna has been embedded.

Such an apparatus is provided with an RFID reader-writer and one or more antennas, and the RFID reader-writer can read information of RFID tags on the articles in the case via the antenna(s). If a simple flat antenna is installed as the antenna, there will be a space/zone at a so-called a null point at which tags will be difficult to read. Therefore, a phased array antenna that changes beam direction by controlling the phase of a current fed to the plurality of antennas in the phased array and methods of moving the antenna have been proposed.

However, if a phased array antenna is used in the inspection apparatus, a null point may still occur between array antennas, so that remains difficult to read RFID tags at all points within the inspection apparatus. Furthermore, if the antenna is to be moved, a coaxial cable connected to the antenna repeatedly bends, such that there is a problem in durability of the cable.

DETAILED DESCRIPTION

According to one embodiment, a movable antenna includes a holder, an antenna radiating element attached to the holder, a first feed element that is attached to the holder and electromagnetically coupled to the antenna radiating element, a base plate in a facing arrangement with the holder, a second feed element on the base plate and configured to face and overlap at least a portion of the first feed element, and a mechanism that moves the holder in a longitudinal direction of the second feed element while maintaining an interval between the first and second feed element permitting energy to be transferred between the first and second feed elements.

Hereinafter, embodiments will be described with reference to the drawings.

First Embodiment

Figure 1:
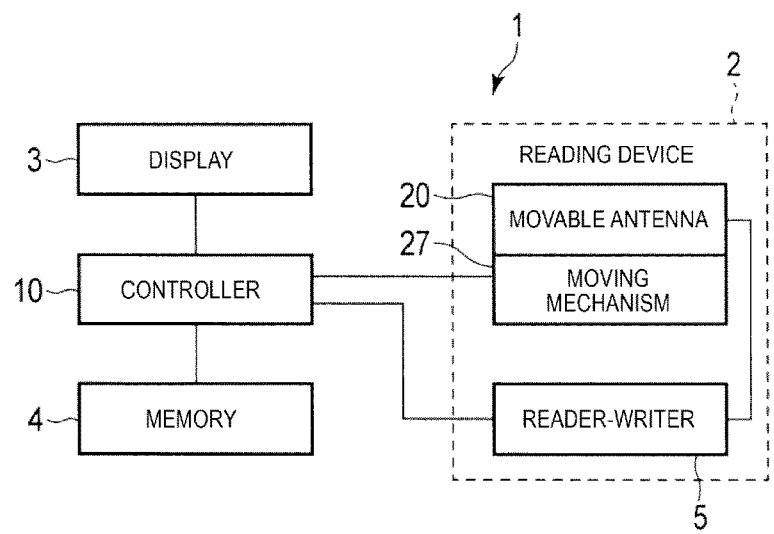
FIG. 1 is a block diagram of an inspection apparatus according to an embodiment.

FIG. 1 is a block diagram of the configuration of an inspection apparatus 1 according to a first embodiment. The inspection apparatus 1 is installed and used in, for example, a distribution warehouse. The inspection apparatus 1 includes a controller 10, a reading device 2, a display 3, and a memory 4.

The controller 10 controls a moving mechanism 27 for moving a movable antenna 20 of the reading device 2 and a reader-writer 5 connected to the movable antenna 20. The controller 10 functions as a data processing unit for executing various processes/functions based on information that is read from a wireless tag (not specifically illustrated) that has been attached to the article. The wireless tag is, for example, a radio frequency identification (RFID) tag, in particular, an RFID tag operating in a UHF band.

Figure 2:
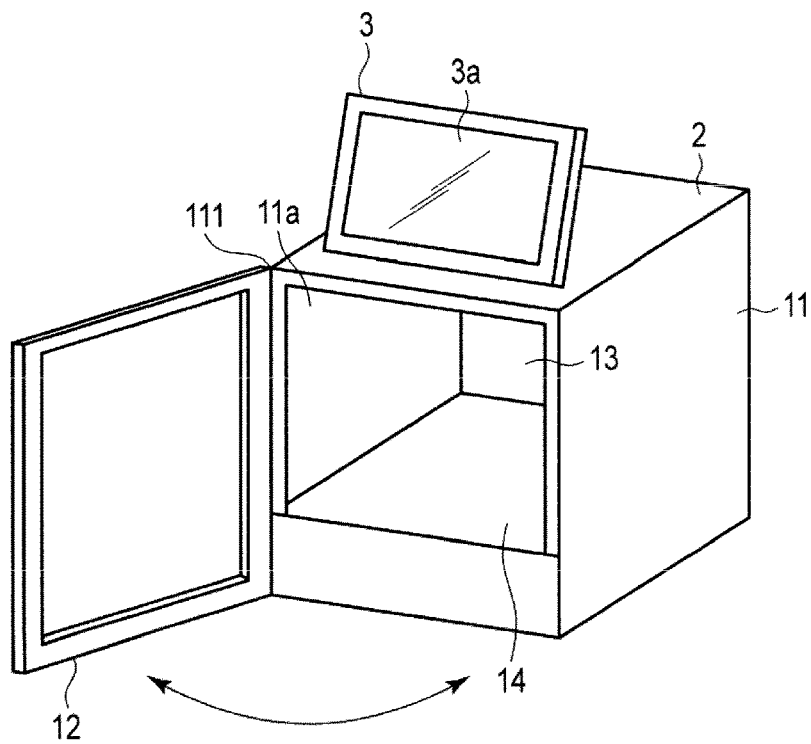
FIG. 2 is an external perspective view of a reading device incorporated in an inspection apparatus.

FIG. 2 is a perspective view of the reading device 2 incorporated in the inspection apparatus 1. The display 3 is attached to an upper wall of an enclosure 11 (also referred to as an outer casing) of the reading device 2. The display 3 is provided with a touch panel 3a. As the display 3, for example, a liquid crystal display is used.

Figure 3:
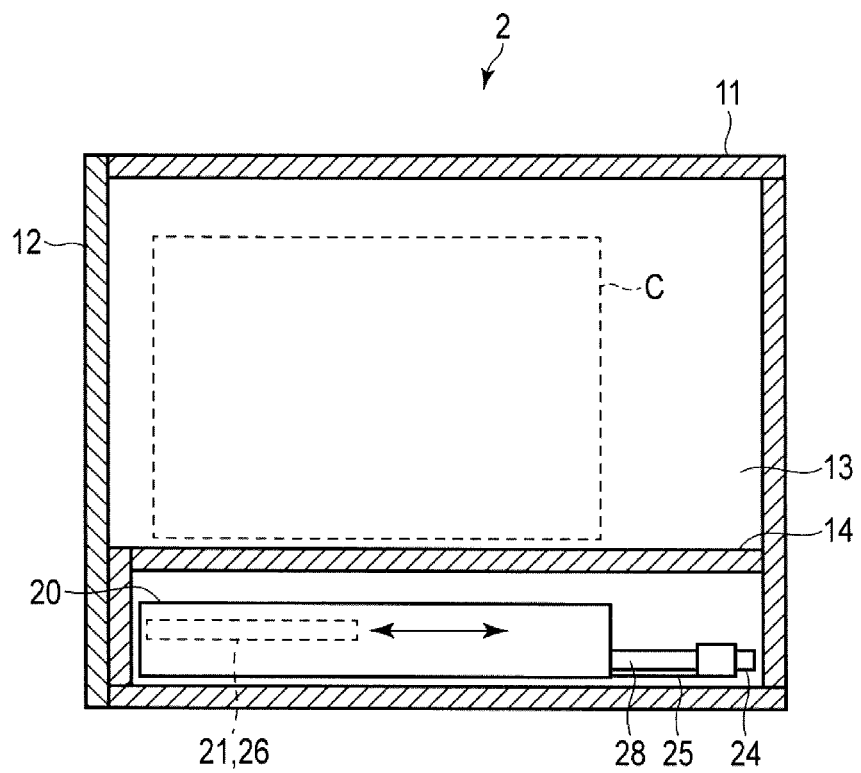
FIG. 3 is a schematic cross-sectional view of the reading device.

The enclosure 11 has an opening and closing cover (e.g., a door or a lid) 12 which covers an opening 11a, which is an entrance through which a case C (see FIG. 3), can be placed into the enclosure 11. The case C may include a plurality of articles stored therein. FIG. 2 illustrates the reading device 2 with the cover 12 in the open state. FIG. 3 is a schematic cross-sectional view of the enclosure 11 with cover 12 closed.

The reading device 2 is incorporated in the inspection apparatus 1 and outputs (transmits) various information read from the RFID tag to the controller 10. In this manner, the reading device 2 is integrated with the inspection apparatus 1.

The controller 10 executes data processing relating to registration and management of the article according to the information read from the RFID tag attached to the article in the reading device 2.

The RFID tag (not specifically illustrated) stores an article code or the like for identifying the article to which the tag has been attached.

Thereafter, the reading device 2 will be described.

The enclosure 11 of the reading device 2 is configured in a substantially box shape. The enclosure 11 has a shape that is long in the depth direction relative to the lateral width dimension. In the enclosure 11, a reading chamber (storage chamber) 13 having a size capable of storing the case C therein is formed.

Outer walls (outer surfaces) of the enclosure 11 and the opening and closing cover 12 are formed of a radio wave reflecting material such as a metal plate or a molding material, or a radio wave absorbing material. There is no particular limitation on inner walls (inner surfaces) of the enclosure 11 and the opening and closing cover 12. However, the inner walls may be covered with the radio wave reflecting material or a radio wave absorbing material.

The cover 12 can be opened and closed on a hinge mechanism 111 provided on the side surface portion of the enclosure 11. By placing the cover 12 in the open state, an operator can place the case C (in which an article has been placed) in of the reading chamber 13 or remove the case C from the reading chamber 13.

In the reading chamber 13, the case C is placed on a table 14. The table 14 comprises an insulative (radio wave permeable) plate-like material such as wooden or glass, and is supported with a predetermined gap from the enclosure 11.

In the reading chamber 13, the movable antenna 20 is provided as an RFID antenna unit to be used for reading and writing information from/to the RFID tag. The movable antenna 20 is provided with a moving mechanism 27 (refer to FIGS. 4 and 5) capable of reciprocating the radiating element 21 and a holder 26 holding the radiating element 21 (e.g., a planar antenna), for example, in a horizontal direction parallel to the depth of the reading chamber 13.

The movable antenna 20 is connected to an antenna port of the reader-writer 5 via a coaxial cable connected to a coaxial connector 24 or the like. The reader-writer 5 is preferably installed at a position which does not hinder the reading and writing of the RFID tag. Specifically, the reader-writer 5 may be disposed in the enclosure 11 but outside the reading chamber 13. The reader-writer 5 may be provided in an empty space, such as a gap between the table 14 and the bottom surface of the enclosure 11, within the reading chamber 13. In this case, the reader-writer 5 further may be covered with a protective material, such as a radio wave absorbing material, to eliminate or reduce the influence of the radio waves on the reader-writer 5 and likewise the influence on the radio wave environment on the outside of reading chamber 13 that might be caused by the reader-writer 5.

The moving mechanism 27 is controlled by the controller 10. The movable antenna 20 moves the position of the radiating element 21 with the moving mechanism 27 during the reading of the information from the RFID tag. That is, the movable antenna 20 starts reading the information from the RFID tag and starts the movement of the radiating element 21, and then stops the movement if the reading is completed.

Inside the reading chamber 13, radio waves radiated from the radiating element 21 and radio waves reflected at the enclosure 11 and the like are combined may form an interference pattern in the reading chamber 13. Communication is performed with the RFID tag(s) within the reading chamber 13, that is, the RFID tag attached to each article contained in the case C by the combined waves (the directly emitted waves and the reflected waves).

Since the radio waves inside the reading chamber 13 constantly changes by the movement of the radiating element 21 during the reading, a null point, at which the information of the RFID tag (s) cannot be read, can be reduced or eliminated. Therefore, even if there are several RFID tags that are oriented in various directions on the articles included in the case C, such that, for example, the articles are stacked in an overlapped manner in the case C, the RFID tags attached to the different articles in the case C can still be efficiently, reliably and stably read.

Thereafter, the detailed configuration of the movable antenna 20 in the first embodiment will be described.

Figure 4:
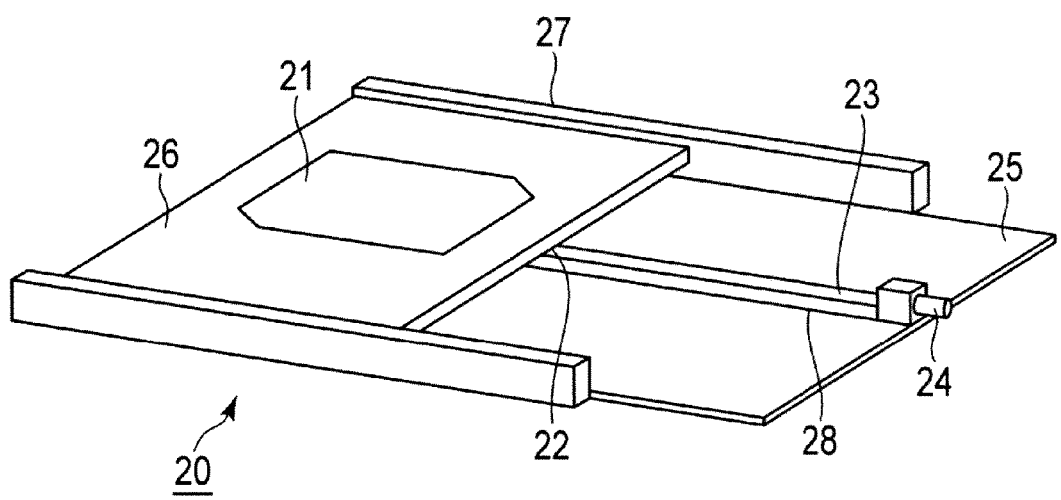
FIG. 4 is a perspective view illustrating a movable antenna according to a first embodiment.
Figure 5:
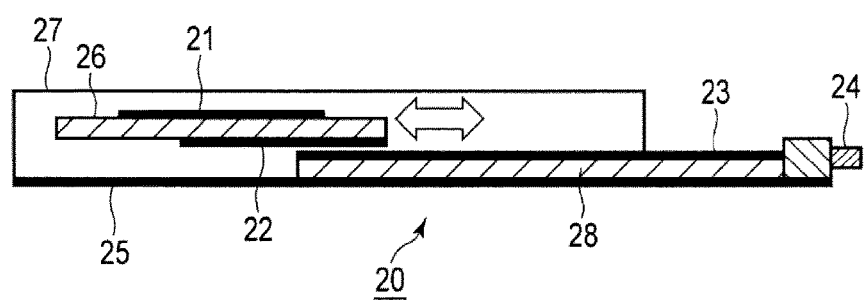
FIG. 5 is a cross-sectional view of the movable antenna.

FIG. 4 is a perspective view illustrating the movable antenna 20 according to the first embodiment, and FIG. 5 is a cross-sectional view of the movable antenna 20.

The movable antenna 20 includes a rectangular plate-like holder 26, and a rectangular base plate 25. A length of one direction of the base plate 25 is equal to one side of the holder 26 and a length of the other direction of the base plate 25 is sufficiently longer than the holder 26. The holder 26 is held by the moving mechanism 27 in parallel above the base plate 25 with a certain interval therebetween. The holder 26 is reciprocally movable along a direction above the base plate 25 while maintaining a constant interval with the moving mechanism 27.

The holder 26 holds the radiating element 21 on the upper surface thereof and holds a first feed element 22 on the lower surface thereof. That is, the radiating element 21 and the first feed element 22 are disposed in parallel with the holder 26 interposed therebetween, and are attached to the holder 26 so as to be movable in a direction parallel to a length (horizontal direction) of the base plate 25 by the moving mechanism 27.

The moving mechanism 27 includes, for example, a stepping motor, a stepping motor driving circuit, a gear, and the like, and the movement direction and the movement speed thereof are controlled by an external device (e.g., controller 10 or reader-writer 5). The moving mechanism 27 is not particularly limited provided the mechanism 27 can move the holder 27 as described.

A second feed element 23 is disposed along the moving direction of the holder 26 at the center of the upper surface of the base plate 25. The second feed element 23 is fixed to the base plate 25 via a holder 28 so as to keep a fixed interval from the base plate 25 and is connected to the coaxial connector 24 provided at the end portion of the base plate 25. The second feed element 23 is disposed up to a range where the radiating element 21 and the first feed element 22 are to be moved integrally with the holding member 26 from the end portion of the base plate 25.

The first feed element 22 and the second feed element 23 are provided with a minute (small) interval. The interval therebetween is small enough to permit feeding of an electromagnetic signal by an electromagnetic coupling feeding method between these two feed elements (22 and 23). Thus, these two feed elements (22 and 23) are brought close to each other. The radiating element 21 and the first feed element 22, which are provided on the holder 26, are reciprocated by the moving mechanism 27 while the minute interval between the first feed element 22 and the second feed element 23 is maintained.

The first feed element 22 and the radiating element 21 fixed to the holder 26 can move while partially overlapping the second feed element 23 along the longitudinal direction of the second feed element 23. Therefore, while being moved, the first feed element 22 is fed from the second feed element 23 using the electromagnetic coupling feeding method.

The holder 26 and holder 28 include, for example, a resin such as acrylonitrile butadiene styrene (ABS) or a dielectric such as a glass epoxy substrate. However, the material of the holder 26 and the holder 28 is not particularly limited. If the glass epoxy substrate is used for the holder 26, the radiating element 21 and the first feed element 22 can be formed by a copper foil pattern disposed on the glass epoxy substrate, for example.

The radiating element 21 is fed from the first feed element 22 by a proximity coupling feeding method, which electromagnetically couples the radiating element 21 with the first feed element 22 disposed with the holding member 26 and having a dielectric interposed therebetween.

Figure 6:
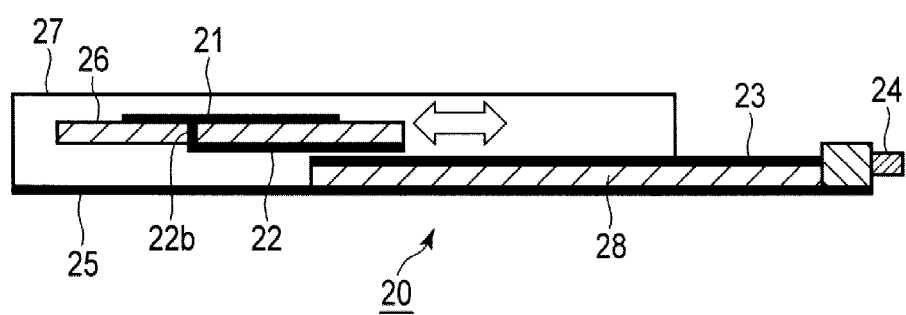
FIG. 6 is a cross-sectional view illustrating a modified example of the movable antenna.

As a method of feeding the radiating element 21, as illustrated in FIG. 6, the radiating element 21 may be connected with the first feed element 22 by a feed portion 22b and fed directly.

If the movable antenna 20 according to the first embodiment is applied to the inspection apparatus 1, it is desirable that the polarization characteristic of the movable antenna 20 is circularly polarized. In the case C stored within the reading device 2, the articles may be arranged in various orientations such that the orientations of the RFID tags are random. Therefore, the polarization characteristic of the movable antenna 20 is preferably circularly polarized, so that the information of the RFID tags attached to the articles can be reliably read no matter the particular orientation of an article within the case C.

In the movable antenna 20 illustrated in FIG. 4, a notch is provided at a pair of diagonal corners of the radiating element 21 so as to function as a circular polarized antenna. Such a notch is generally called a degenerate separation element or a perturbation element. It is possible to use a configuration in which not only the notch is in the square radiating element 21 as illustrated in FIG. 4, but also a notch is in a circular radiating element.

In this manner, in the movable antenna 20 according to the first embodiment, the radiating element 21 and the first feed element 22 can move integrally with the holder 26 interposed therebetween, while the minute interval is maintained between the first feed element 22 and the second feed element 23, and power can be fed by the electromagnetic coupling feeding method. That is, since the radiating element 21 has no parts that bend while the antenna moves, unlike a coaxial cable connecting to a fixed feed element, the durability of the movable antenna 20 can be improved.

Second Embodiment

Thereafter, a second embodiment will be described. In the second embodiment, instead of the movable antenna 20 as in the first embodiment, a movable antenna 40 (illustrated in FIGS. 7 and 8) is provided in the reading device 2.

Figure 7:
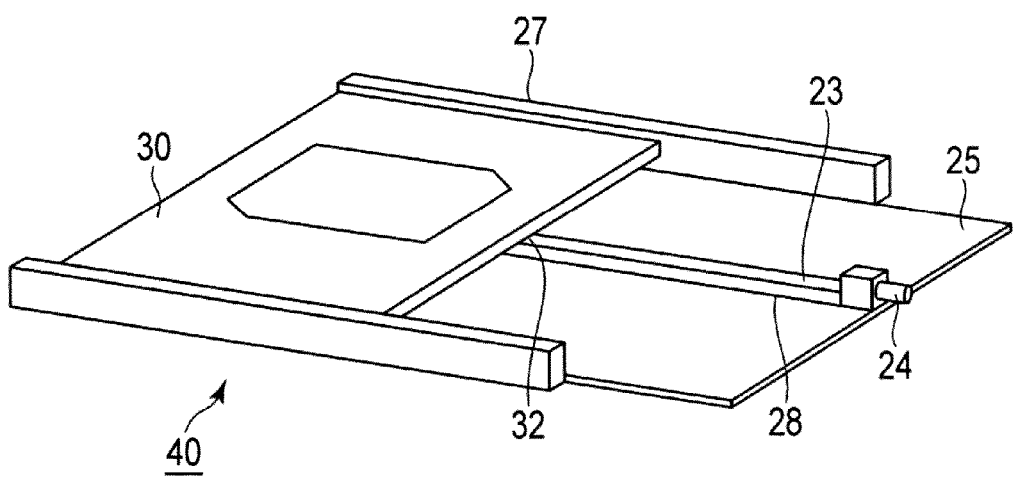
FIG. 7 is a perspective view illustrating a movable antenna according to a second embodiment.
Figure 8:
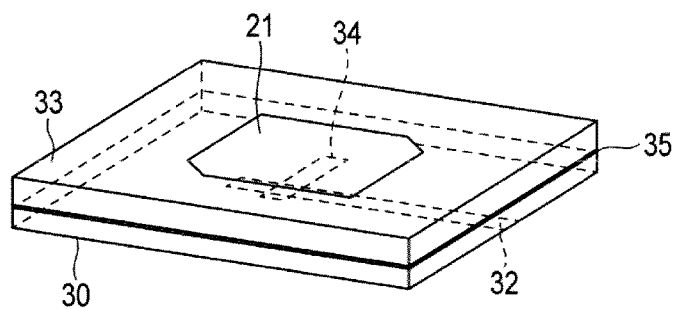
FIG. 8 is a perspective view illustrating a planar antenna provided in the movable antenna.

FIG. 7 is a perspective view illustrating the movable antenna 40 according to the second embodiment, and FIG. 8 is a perspective view illustrating a planar antenna 30 provided in the movable antenna 40.

Substantially similar aspect of movable antenna 40 (illustrated in FIG. 7) are denoted by the same reference numerals as those of the movable antenna 20 (illustrated in FIGS. 4 and 5), and a detailed description of these aspects will be omitted.

The movable antenna 40 has a planar antenna 30 instead of the radiating element 21 and the first feed element 22 (each integrated with the holding member 26) of the movable antenna 20 (illustrated in FIG. 4).

In the planar antenna 30, as illustrated in FIG. 8, a radiating element 21 and a first feed element 32 are integrated on the front and back surfaces of a dielectric substrate 33, respectively. Inside the dielectric substrate 33, a base plate 35 is formed as an inner layer. The base plate 35 is provided with a slot 34 in a direction orthogonal to the first feed element 32 and is disposed in the vicinity immediately below the radiating element 21. This configuration is the same as a micro strip antenna of a slot coupled feeding method. The radiating element 21 is fed by being electromagnetically coupled to the first feed element 32 via the slot 34.

The planar antenna 30 can be moved in parallel (along a horizontal direction) to the base plate 25 by a moving mechanism 27, similarly to the first embodiment. The moving mechanism 27 can hold the planar antenna 30 and cause the planar antenna 30 to reciprocate along the longitudinal direction of the second feed element 23.

The first feed element 32 and the second feed element 23 are formed on the back surface of the dielectric substrate 33 and are provided with an interval therebetween that is capable of feeding by the electromagnetic coupling feeding method, and are thus brought close to each other. The planar antenna 30 is reciprocated by the moving mechanism 27 while the interval between the first feed element 32 and the second feed element 23 is maintained.

The planar antenna 30 can move while partially overlapping with the second feed element 23 in a direction parallel to a length of the second feed element 23. Therefore, while moving, the first feed element 32 provided in the planar antenna 30 is fed from the second feed element 23 by the electromagnetic coupling feeding method.

In this manner, in the movable antenna 40 according to the second embodiment, the planar antenna 30 can move, while the interval is maintained between the first feed element 32 of the planar antenna 30 and the second feed element 23 and power can be fed by the electromagnetic coupling feeding method. Therefore, the durability of the movable antenna 40 can be improved, similarly to the first embodiment.

Third Embodiment

Thereafter, a third embodiment will be described. In the third embodiment, instead of the movable antenna 20 as in the first embodiment, a movable antenna 50 illustrated in FIG. 9 is provided in the reading device 2.

Figure 9:
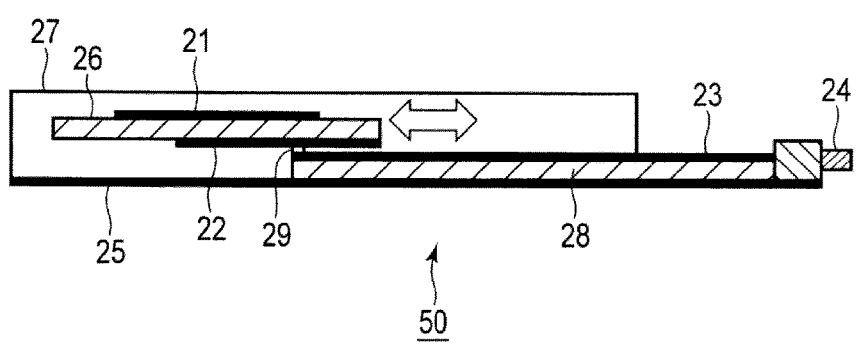
FIG. 9 is a cross-sectional view illustrating a movable antenna according to a third embodiment.

FIG. 9 is a cross-sectional view illustrating the movable antenna 50 according to the third embodiment.

Aspects of movable antenna 50 illustrated in FIG. 9 that are denoted by the same reference numeral as that of the movable antenna 20 illustrated in FIGS. 4 and 5, are substantially the same as the aspects previously explained and a detailed description thereof will be omitted.

In the movable antenna 50 according to the third embodiment, as illustrated in FIG. 9, a minute interval is between the first feed element 22 and the second feed element 23, and the first feed element 22 and the second feed element 23 are connected by a contact point 29. The contact point 29 is fixed to, for example, the first feed element 22, and with the movement of the radiating element 21 and the first feed element 22, the contacting position of the contact point 29 with the second feed element 23 moves.

The radiating element 21 and the first feed element 22 are reciprocated by the moving mechanism 27 while the first feed element 22 and the second feed element 23 are connected by the contact point 29. Therefore, the first feed element 22 is fed from the second feed element 23 via the contact point 29 while moving.

As a method of feeding to the radiating element 21, similarly to the first embodiment, the proximity coupling feeding method that electromagnetically couples with the first feed element 22 may be used. Further, as illustrated in FIG. 6, a direct feeding method in which the first feed element 22 and the radiating element 21 are connected by a feed cable 22b may be used.

It is also possible to connect the first feed element 32 and the second feed element 23 described above in the second embodiment by using the contact point 29. In this case, the contact point 29 is fixed to, for example, the first feed element 32, and with movement of the movable antenna 40, the contact position of the contact point 29 in contact with the second feed element 23 moves.

In this manner, in the movable antenna 50 according to the third embodiment, the first feed element 22 and the second feed element 23 are connected by the contact point 29 and power can thus be fed so that the radiating element 21 and the first feed element 22 (which are integrated with the holding member 26 interposed therebetween) can be moved. That is, since the radiating element 21 has no parts that bend while the antenna moves, unlike a coaxial cable connecting to a fixed feed element, the durability of the movable antenna 50 can be improved.

In each of the example embodiments described above, the reading device 2 is provided with one movable antenna. However, a plurality of movable antennas may be provided. A movable antenna may be provided at locations other than at the bottom surface of the enclosure 11, as illustrated in FIG. 3, but also may be disposed on the side surface or the rear surface of the enclosure 11 or on the cover 12.

In each of the example embodiments described above, the inspection apparatus 1 is operated by an operator as described for warehouse inventory management. However, these embodiments can also be applied to an inspection apparatus (e.g., cash register) operated by a clerk (e.g., cashier).

The movable antennas 20, 40, and 50 can be applied not only to an inspection apparatus 1 but also to other apparatuses that move a radiating element (e.g., antenna) for reading information from an RFID tag.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A movable antenna, comprising:
   an antenna radiating element;
   a first feed element configured to feed power to the antenna radiating element by a proximity coupling feeding method via a first dielectric material between the first feed element and the antenna radiating element;
   a second feed element configured to feed power to the first feed element by the proximity coupling feeding method via a second dielectric material between the first and second feed elements;
   a mechanism configured to move the antenna radiating element and the first feed element in a first direction while maintaining an interval between the first and second feed elements in a second direction intersecting the first direction; and
   a controller configured to control the mechanism to move, during a tag reading process, the antenna radiating element and the first feed element while maintaining the interval.

2. The movable antenna according to claim 1, wherein the antenna radiating element is a planar antenna.

3. The movable antenna according to claim 1, wherein the antenna radiating element is a portion of a phased array antenna.

4. The movable antenna according to claim 1, wherein the first feed element is electromagnetically coupled to the second feed element across the interval.

5. The movable antenna according to claim 1, further comprising a coaxial connector electrically connected to the second feed element.

6. The movable antenna according to claim 1, wherein
   the antenna radiating element is disposed on an upper surface of the first dielectric material, and
   the first feed element is disposed on a lower surface of the first dielectric material.

7. The movable antenna according to claim 6, wherein the antenna radiating element and the first feed element comprise metal foil patterns.

8. The movable antenna according to claim 6, wherein the antenna radiating element and the first feed element are electromagnetically coupled to each other across a thickness of the first dielectric material.

9. The movable antenna according to claim 1, wherein the mechanism comprises two wall surfaces between which the antenna radiating element and the first feed element are moved.

10. An electronic tag reading apparatus, comprising:
    a casing including a chamber into which an electronic tag can be placed for reading;
    a movable antenna in proximity to the chamber, the movable antenna comprising:
      an antenna radiating element;
      a first feed element configured to feed power to the antenna radiating element by a proximity coupling feeding method via a first dielectric material between the first feed element and the antenna radiating element;
      a second feed element configured to feed power to the first feed element by the proximity coupling feeding method via a second dielectric material between the first and second feed elements;
      a mechanism configured to move the antenna radiating element and the first feed element in a first direction while maintaining an interval between the first and second feed elements in a second direction intersecting the first direction; and
      a controller configured to control the mechanism to move, during a tag reading process, the antenna radiating element and the first feed element while maintaining the interval.

11. The electronic tag reading apparatus according to claim 10, further comprising:
    a plate in the chamber and disposed between the movable antenna and the electronic tag, the plate being comprised of a material that is permeable to a signal radiated by the movable antenna.

12. The electronic tag reading apparatus according to claim 10, further comprising:

a tag reader-writer connected to the movable antenna and configured to supply a signal to the movable antenna.

13. The electronic tag reading apparatus according to claim 10, wherein the electronic tag is a radio frequency identification (RFID) tag operating in an ultrahigh frequency (UHF) band.

14. The electronic tag reading apparatus according to claim 10, wherein the antenna radiating element is one of a planar antenna and a portion of a phased array antenna.

15. The electronic tag reading apparatus according to claim 10, wherein the first feed element is electromagnetically coupled to the second feed element across the interval.

16. The electronic tag reading apparatus according to claim 10, wherein the mechanism comprises two wall surfaces between which the antenna radiating element and the first feed element are moved.

* * * * *